US00RE44876E

(19) United States
(12) Reissued Patent
Galbreath et al.

(10) Patent Number: US RE44,876 E
(45) Date of Reissued Patent: Apr. 29, 2014

(54) PROXIMITY SEARCH METHODS USING TILES TO REPRESENT GEOGRAPHICAL ZONES

(75) Inventors: Nicholas Galbreath, Tokyo (JP); Yuh-Wen Soung, Saratoga, CA (US)

(73) Assignee: Facebook, Inc., Menlo Park, CA (US)

(21) Appl. No.: 13/277,008

(22) Filed: Oct. 19, 2011

Related U.S. Patent Documents

Reissue of:
(64) Patent No.: 7,606,687
Issued: Oct. 20, 2009
Appl. No.: 10/941,227
Filed: Sep. 14, 2004

(51) Int. Cl.
*G06G 7/48* (2006.01)

(52) U.S. Cl.
USPC ..... 703/3; 703/2; 701/431; 701/411; 701/469; 701/438; 701/533

(58) Field of Classification Search
USPC ..... 340/988, 539.11; 709/220, 229, 204, 709/230; 701/455; 379/196
See application file for complete search history.

(56) References Cited

U.S. PATENT DOCUMENTS

| | | | | |
|---|---|---|---|---|
| 5,839,088 | A | 11/1998 | Hancock et al. | |
| 5,848,373 | A * | 12/1998 | DeLorme et al. | 701/455 |
| 5,950,200 | A | 9/1999 | Sudai et al. | |
| 5,956,397 | A * | 9/1999 | Shaffer et al. | 379/220.01 |
| 5,963,951 | A * | 10/1999 | Collins | 1/1 |
| 5,968,109 | A * | 10/1999 | Israni et al. | 701/532 |
| 5,974,419 | A * | 10/1999 | Ashby | 340/990 |
| 5,978,768 | A * | 11/1999 | McGovern et al. | 705/321 |
| 6,014,090 | A | 1/2000 | Rosen et al. | |
| 6,047,236 | A | 4/2000 | Hancock et al. | |
| 6,052,122 | A | 4/2000 | Sutcliffe et al. | |
| 6,061,681 | A | 5/2000 | Collins | |
| 6,073,105 | A | 6/2000 | Sutcliffe et al. | |
| 6,073,138 | A | 6/2000 | de l'Etraz et al. | |
| 6,175,831 | B1 | 1/2001 | Weinreich et al. | |
| 6,202,023 | B1 | 3/2001 | Hancock et al. | |
| 6,223,122 | B1 | 4/2001 | Hancock et al. | |
| 6,249,282 | B1 | 6/2001 | Sutcliffe et al. | |
| 6,266,612 | B1 | 7/2001 | Dussell et al. | |
| 6,269,369 | B1 | 7/2001 | Robertson | |
| 6,324,541 | B1 | 11/2001 | de l'Etraz et al. | |
| 6,326,918 | B1 | 12/2001 | Stewart | |
| 6,339,397 | B1 | 1/2002 | Baker | |
| 6,339,744 | B1 | 1/2002 | Hancock et al. | |
| 6,343,274 | B1 | 1/2002 | McCollom et al. | |

(Continued)

OTHER PUBLICATIONS

U.S. Appl. No. 10/462,142, filed Jun. 16, 2003, Abrams.

(Continued)

*Primary Examiner* — Omar Fernandez Rivas
*Assistant Examiner* — Cuong Luu
(74) *Attorney, Agent, or Firm* — Baker Botts L.L.P.

(57) ABSTRACT

A proximity search engine for carrying out a proximity search with respect to a reference location uses as a reference frame the earth divided into tiles, which are predefined geographic regions of substantially equal areas. Records that are searched based on proximity to a reference location include location pointers, each of which identifies a particular tile that encompasses the physical location indicated by the corresponding record. When the proximity search is carried out, the tiles that are within a specified distance from the reference location are obtained and records having location pointers corresponding to such tiles are selected for inclusion in the search results.

32 Claims, 9 Drawing Sheets

(56) References Cited

U.S. PATENT DOCUMENTS

| | | | | |
|---|---|---|---|---|
| 6,343,317 | B1 | 1/2002 | Glorikian | |
| 6,347,230 | B2 | 2/2002 | Koshima et al. | |
| 6,349,257 | B1 | 2/2002 | Liu et al. | |
| 6,349,290 | B1 | 2/2002 | Horowitz et al. | |
| 6,353,785 | B1 | 3/2002 | Shuman et al. | |
| 6,356,812 | B1 | 3/2002 | Cragun | |
| 6,356,838 | B1 | 3/2002 | Paul | |
| 6,360,167 | B1 | 3/2002 | Millington et al. | |
| 6,363,427 | B1 | 3/2002 | Teibel et al. | |
| 6,366,962 | B1 | 4/2002 | Teibel | |
| 6,370,510 | B1 | 4/2002 | McGovern et al. | |
| 6,370,513 | B1 | 4/2002 | Kolawa et al. | |
| 6,370,566 | B2 | 4/2002 | Discolo et al. | |
| 6,374,177 | B1 | 4/2002 | Lee et al. | |
| 6,381,603 | B1 | 4/2002 | Chan et al. | |
| 6,401,039 | B1 * | 6/2002 | Baron et al. | 702/3 |
| 6,408,309 | B1 | 6/2002 | Agarwal | |
| 6,505,121 | B1 | 1/2003 | Russell | |
| 6,542,748 | B2 | 4/2003 | Hendrey et al. | |
| 6,618,593 | B1 | 9/2003 | Drutman et al. | |
| 6,701,307 | B2 * | 3/2004 | Himmelstein et al. | 707/743 |
| 6,735,568 | B1 | 5/2004 | Buckwalter et al. | |
| 6,741,188 | B1 | 5/2004 | Miller et al. | |
| 6,906,643 | B2 * | 6/2005 | Samadani et al. | 340/995.18 |
| 7,010,308 | B2 * | 3/2006 | Hendrey | 455/456.5 |
| 7,071,842 | B1 * | 7/2006 | Brady, Jr. | 340/988 |
| 7,072,963 | B2 * | 7/2006 | Anderson et al. | 709/225 |
| 7,876,215 | B1 | 1/2011 | Brady | |
| 8,102,253 | B1 * | 1/2012 | Brady, Jr. | 340/539.11 |
| 2002/0051540 | A1 * | 5/2002 | Glick et al. | 380/258 |
| 2002/0054082 | A1 * | 5/2002 | Karpf | 345/738 |
| 2002/0086676 | A1 | 7/2002 | Hendrey et al. | |
| 2002/0106066 | A1 * | 8/2002 | Swanson et al. | 379/196 |
| 2002/0123934 | A1 * | 9/2002 | Tanaka et al. | 705/20 |
| 2002/0151315 | A1 * | 10/2002 | Hendrey | 455/466 |
| 2003/0063072 | A1 * | 4/2003 | Brandenberg et al. | 345/173 |
| 2003/0069693 | A1 * | 4/2003 | Snapp et al. | 701/213 |
| 2003/0074471 | A1 * | 4/2003 | Anderson et al. | 709/245 |
| 2003/0154194 | A1 | 8/2003 | Jonas | |
| 2004/0034601 | A1 | 2/2004 | Kreuzer | |
| 2004/0064334 | A1 * | 4/2004 | Nye | 705/1 |
| 2004/0066330 | A1 * | 4/2004 | Knockeart et al. | 342/357.07 |
| 2004/0068582 | A1 * | 4/2004 | Anderson et al. | 709/245 |
| 2004/0076279 | A1 * | 4/2004 | Taschereau | 379/218.01 |
| 2004/0077359 | A1 | 4/2004 | Bernas et al. | |
| 2004/0078489 | A1 * | 4/2004 | Anderson et al. | 709/245 |
| 2004/0104842 | A1 * | 6/2004 | Drury et al. | 342/357.13 |
| 2004/0110515 | A1 * | 6/2004 | Blumberg et al. | 455/456.1 |
| 2004/0117358 | A1 * | 6/2004 | von Kaenel et al. | 707/3 |
| 2004/0139049 | A1 * | 7/2004 | Hancock et al. | 707/1 |
| 2004/0144301 | A1 | 7/2004 | Neudeck et al. | |
| 2004/0148275 | A1 | 7/2004 | Achlioptas | |
| 2004/0198398 | A1 * | 10/2004 | Amir et al. | 455/456.6 |
| 2004/0266457 | A1 * | 12/2004 | Dupray | 455/456.5 |
| 2005/0003831 | A1 * | 1/2005 | Anderson | 455/456.1 |
| 2005/0015307 | A1 * | 1/2005 | Simpson et al. | 705/26 |
| 2006/0200492 | A1 * | 9/2006 | Villena et al. | 707/104.1 |
| 2007/0005373 | A1 * | 1/2007 | Villena et al. | 705/1 |
| 2008/0133716 | A1 * | 6/2008 | Rao et al. | 709/220 |

OTHER PUBLICATIONS

U.S. Appl. No. 10/854,054, filed May 26, 2004, Galbreath et al.
U.S. Appl. No. 10/854,057, filed May 26, 2004, Galbreath et al.
"MySQL Reference Manual", <http://dev.mysql.com/doc/mysql/en/index.html>, §§ 19.1 and 19.6 (2004).

* cited by examiner

FIG. 5

Member Sign Up

Please enter the information below.

| | |
|---|---|
| E-mail: | user@mail.com |
| First Name: | John |
| Last Name: | Doe |
| Address: | 555 Villa St. |
| City: | Mountain View |
| State or Country: | CA |
| Zip/Postal Code: | 94043 |

SIGN UP

FIG. 7

| ID | First Name | Last Name | Address | City | State | Zip | Lat | Long | x | y |
|---|---|---|---|---|---|---|---|---|---|---|
| ME | * | * | * | * | * | 94087 | 37.4 | -122.0 | 2589 | 937 |
| A | * | * | * | London | UK | * | 51.5 | -0.13 | 2876 | 2276 |
| B | * | * | * | Seoul | Korea | * | 37.5 | 127.0 | 2591 | 4950 |
| C | * | * | * | Perth | Australia | * | -27.5 | 153.0 | 1271 | 6003 |
| | | | | | * * * | | | | | |
| U | John | Doe | 555 Villa St. | Mt. View | CA | 94043 | 37.4 | -122.1 | 2589 | 935 |

FIG. 8

Proximity Search

Search for all members who are near you.

| | |
|---|---|
| Your Location: | 94087 |
| Latitude: | |
| Longitude: | |
| Proximity (in miles): | 25 |

SEARCH

PROXIMITY SEARCH METHODS USING TILES TO REPRESENT GEOGRAPHICAL ZONES

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention generally relates to proximity search techniques, and more specifically, to a method and a system for performing searches based on proximity to a reference location.

2. Description of the Related Art

A geographic location may be represented as latitude and longitude. FIG. 1 illustrates a map of the world with latitude lines shown every 30 degrees and longitude lines shown every 30 degrees. The distance between any two points on the map shown in FIG. 1 may be calculated based on their latitude and longitude positions, and the known radius of the earth (6371.01 km or 3958.76 miles).

There are many ways of obtaining the latitude and longitude for a particular geographic location. Latitude and longitude positions for locations specified using zip codes, postal codes and cities may be obtained from third party databases using a simple table look-up. Also, a handheld electronic device, such as a pocket PC, cell phone or a personal digital assistant (PDA), may have a GPS receiver and associated software for determining the latitude and longitude position of the handheld electronic device.

In the current art, a proximity search of database records with respect to a reference location is carried out by calculating the distances between the reference location and the locations associated with each of the database records. First, the latitude and longitude positions of the reference location are obtained. Second, the latitude and longitude positions of the locations associated with the database records are obtained. Third, the distances between the reference location and the locations associated with the database records are calculated. Fourth, the database records associated with locations that are within a certain distance (as specified in the proximity search request) from the reference location are selected to be included in the search results.

When the number of database records is large, the proximity search method carried out in the above manner becomes computationally very expensive because of the large number of distance calculations that are required. Distance calculations that are based on zip codes and postal codes have been used to reduce the computational cost, but are not very accurate, and only work for locations in countries having postal codes that are mapped to latitude-longitude values. Quad trees and R-Trees that rely on a two-dimensional grid of regions and subregions have been used to describe the locations of objects in a two-dimensional space, but they require binary-like searches to zero in on the appropriate regions. For proximity searching, they are either too inaccurate (e.g., when the region size is large) or computationally too expensive (e.g., when the region size is sufficiently small).

SUMMARY OF THE INVENTION

The invention provides an improved proximity search technique that is either faster or more accurate than the ones employed in the current art. According to the invention, the earth is divided into predefined geographic regions of substantially equal areas, referred to as tiles, and records that are searched based on proximity to a reference location include location pointers, each of which identifies a particular tile that encompasses the physical location indicated by the corresponding record. When the proximity search is carried out, the tiles that are within a specified distance from the reference location are obtained and records having location pointers corresponding to such tiles are selected for inclusion in the search results.

The reference location may be specified in the proximity search as a zip code, city-state, or city-country, or the location of the user requesting the proximity search may be retrieved from a database as the reference location. If the user requesting the proximity search is carrying a handheld electronic device that includes a GPS receiver and associated software, the reference location may also be specified as the current location of the user as determined by the GPS receiver and associated software.

After the reference location is determined, the latitude and longitude of the reference location are obtained and the tile that includes the latitude and longitude of the reference location is identified. The searched records that have location pointers that point to those tiles that are within the specified distance from the reference location tile are then selected for inclusion in the search results.

Proximity searches carried out in the above manner no longer require individual distance calculations between the reference location and each database record being searched. As a result, the total number of distance calculations is reduced with the invention and the speed of the executed searches is increased. The invention also provides flexibility in designing proximity searches, e.g., the accuracy of proximity searches can be increased by decreasing the tile size and the speed of the proximity searches can be increased by increasing the tile size.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5 shows a simplified user interface with which a new record is entered into a database;

FIG. 7 illustrates a database containing records having location information;

FIG. 8 shows an input interface for specifying a search query that includes a proximity criteria.

DETAILED DESCRIPTION

Figure 1:
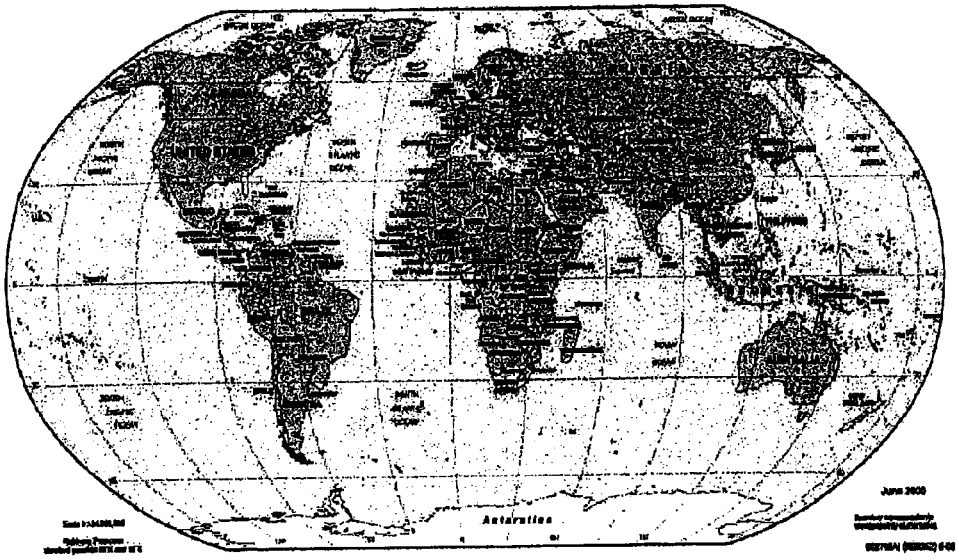
FIG. 1 is a map of the world illustrating latitude and longitude lines that uniquely identify a location on the map.
Figure 2:
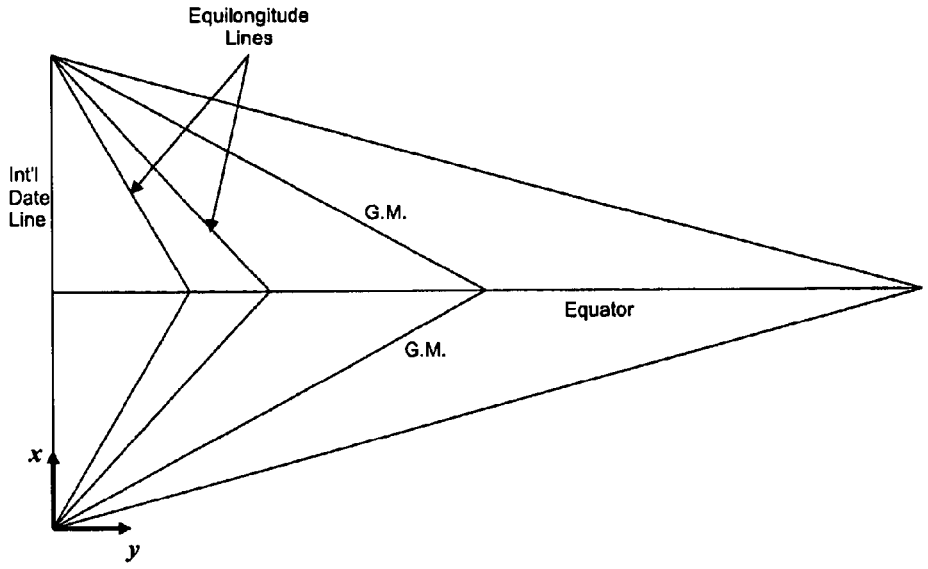
FIG. 2 is a map of the world employing a coordinate system defining points that represent geographic regions having substantially the same area.

Each geographic location in FIG. 1, which can be represented as latitude and longitude, may be mapped onto a point in FIG. 2. In fact, the map of FIG. 1 is divided into a plurality predefined geographical regions or areas, referred to as tiles, and all points contained in one tile map onto a single point in FIG. 2. A tile can have any configuration, but in the embodiment of the invention described herein, each such tile covers roughly the same area in FIG. 1 and all four sides of each such tile have the same fixed length. The formulas used for mapping a location in FIG. 1 that is defined by latitude and longitude onto a point in FIG. 2 are as follows:

LatQ=Int((latitude+90)*k/r+1); and

LongQ=Int((longitude+180)*k Cos (latitude/r+1), where latitude and longitude values are expressed in degrees; k is a factor for converting a 1-degree arc measured with respect to earth's center into miles ($k=2\pi$*(earth's radius)/360°-69.0933 miles/degree); r is the length of each side of a tile (in the illustrated embodiment, r=3.4 miles); and LatQ and LongQ define the position of a tile in the coordinate system shown in FIG. 2.

The LatQ value defines the position of the tile along the x-axis, beginning with LatQ=1, and the LongQ value defines the position of the tile along the y-axis, beginning with LongQ=1. The north pole in FIG. 1 is mapped onto a point at the upper tip of the triangle in FIG. 2 represented by (LatQ=3658, LongQ=1) and the south pole in FIG. 1 is mapped onto a point at the lower tip of the triangle in FIG. 2 represented by (LatQ−1, LongQ−1). The equator, represented by (LatQ=1829, 1<LongQ<7316), maps onto a line that cuts through the center of the triangle in FIG. 2 and divides it into an upper half (northern hemisphere) and a lower half (southern hemisphere). The right tip of the triangle in FIG. 2 represents the (LatQ, LongQ) pair corresponding to the tile that contains the equator at the international date line (longitude: 180° E or 180° W).

The international date line maps onto a line that is shown in FIG. 2 as the left side of the triangle. All other equilongitude lines (i.e., a line connecting points having the same longitude) map onto a pair of lines, the first originating from the north pole (LatQ=3658, LongQ=1) to a point along the equator and the second originating from the south pole (LatQ=1, LongQ=1) to the same point along the equator. The upper and lower sides of the triangle in FIG. 2 represent the international date line that is approached when moving west to east.

The invention will now be described in the context of a social network. A social network is generally defined by the relationships among groups of individuals, and may include relationships ranging from casual acquaintances to close familial bonds. A social network may be represented using a graph structure. Each node of the graph corresponds to a member of the social network. Edges connecting two nodes represent a relationship between two individuals. In addition, the degree of separation between any two nodes is defined as the minimum number of hops required to traverse the graph from one node to the other. A degree of separation between two members is a measure of relatedness between the two members.

Figure 3:
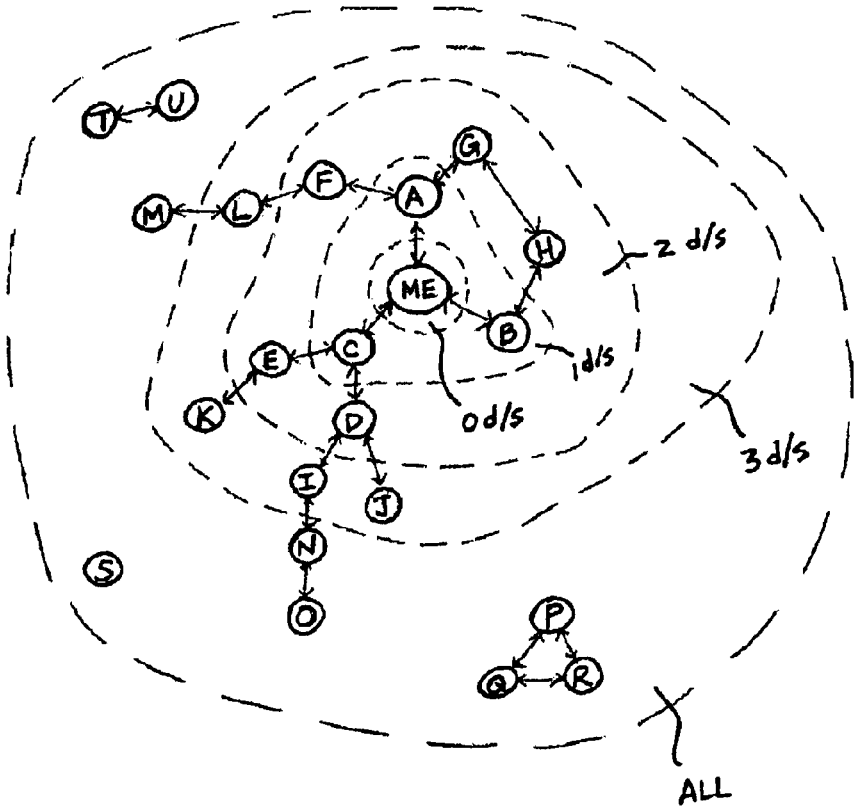
FIG. 3 is a diagram illustrating the relationships between members in a social network.

FIG. 3 illustrates a graph representation of a social network centered on a given individual (ME). Other members of this social network include A-U whose position, relative to ME's, is referred to by the degree of separation between ME and each other member. Friends of ME, which includes A, B, and C, are separated from ME by one degree of separation (1 d/s). A friend of a friend of ME is separated from ME by 2 d/s. As shown, D, E, F and G are each separated from ME by 2 d/s. A friend of a friend of a friend of ME is separated from ME by 3 d/s. FIG. 1 depicts all nodes separated from ME by more than 3 degrees of separation as belonging to the category ALL.

Degrees of separation in a social network are defined relative to an individual. For example, in ME's social network, H and ME are separated by 2 d/s, whereas in G's social network. H and G are separated by only 1 d/s. Accordingly, each individual will have their own set of first, second and third degree relationships.

As those skilled in the art understand, an individual's social network may be extended to include nodes to an Nth degree of separation. As the number of degrees increases beyond three, however, the number of nodes typically grows at an explosive rate and quickly begins to mirror the ALL set.

Figure 4:
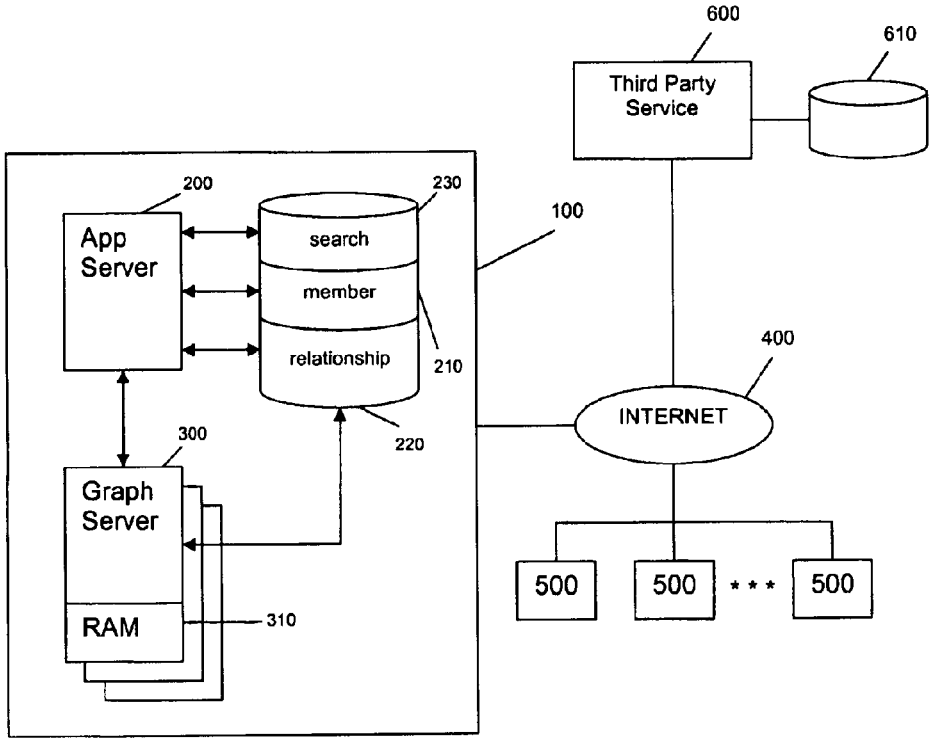
FIG. 4 is a block diagram illustrating a system for creating and managing an online social network.

FIG. 4 is a block diagram illustrating a system for creating and managing an online social network. As shown, FIG. 4 illustrates a system 100, including an application server 200 and graph servers 300. The computers of system 100 are connected by a network 400, e.g., the Internet, and accessible by over the network by a plurality of computers, collectively designated as 500. The application server 200 manages a member database 210, a relationship database 220, and a search database 230.

The member database 210 contains profile information for each of the members in the online social network managed by the system 100. The profile information may include, among other things: a unique member identifier, name, age, gender, location, hometown, references to image files, listing of interests, attributes, and the like. The location information may include: (i) address, city, state, zip code or postal code, and country; (ii) latitude and longitude values associated with the specified address, zip code, postal code, city-state or city-country; and (iii) a pointer to a tile that includes the location associated with the latitude and longitude values. The relationship database 220 stores information defining to the first degree relationships between members. The relationship database 220 stores information relating to the first degree relationships between members. In addition, the contents of the member database 210 are indexed and optimized for search, and stored in the search database 230. The member database 210, the relationship database 220, and the search database 230 are updated to reflect inputs of new member information and edits of existing member information that are made through the computers 500.

The application server 200 also manages the information exchange requests that it receives from the remote computers 500. The graph servers 300 receive a query from the application server 200, process the query and return the query results to the application server 200. Graph servers 300 store a graph representation of the social network defined by all of the members (nodes) and their corresponding relationships (edges). The graph servers 300 respond to requests from application server 200 to identify relationships and the degree of separation between members of the online social network.

The application server 200 is further configured to query a third party service 600 for latitude and longitude values corresponding to location information (e.g., address, zip code, postal code, city-state, city-country, etc.) that it sends as a part of the query. The third party service 600 looks up the latitude and longitude values corresponding to the location specified in the query from its database 610 and returns the latitude and longitude values to the application server 200. In an alternative embodiment, the database containing latitude and longitude values corresponding to locations specified in terms of address, zip code, postal code, city-state, and/or city-country, may be maintained as part of the computer system 100 and accessed internally by the application server 200.

FIG. 5 shows a simplified user interface with which a new record is entered into the member database 210. The inputs include location information such as the address, city, state and zip code. Persons not living in the U.S. will enter country information in place of state and postal code information instead of zip code.

Figure 6:
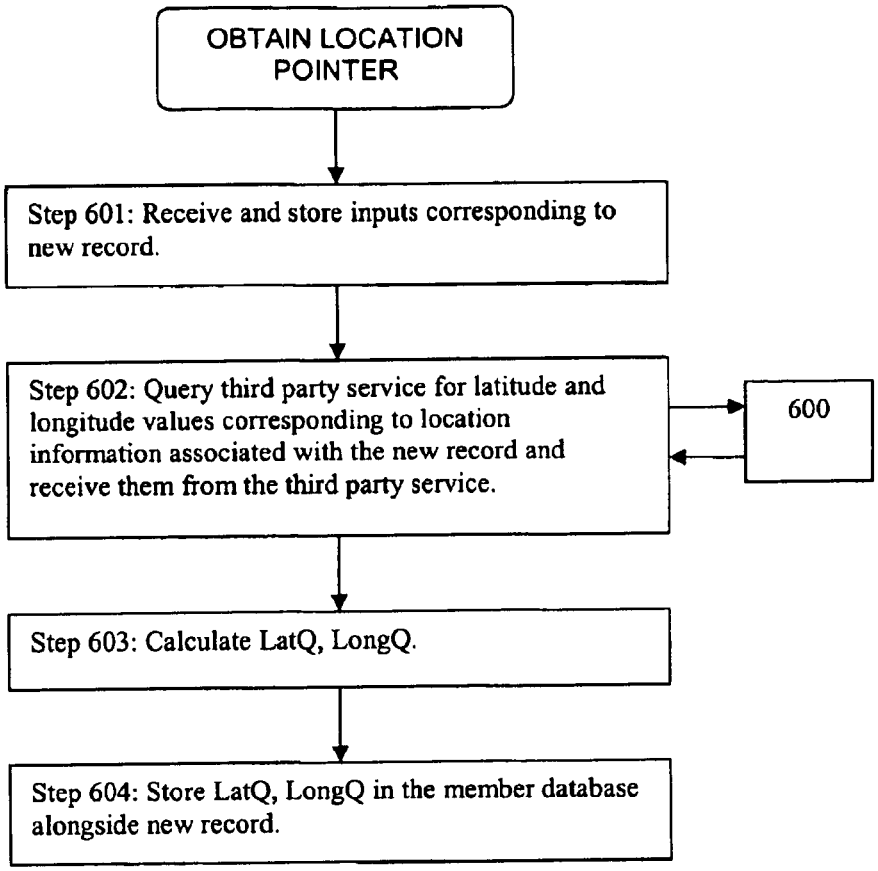
FIG. 6 is a flow diagram illustrating how a location pointer is obtained for the new record entered in FIG. 5.

FIG. 6 is a flow diagram illustrating how a location pointer is obtained for a new record and stored in the member database 210. In Step 601, user inputs, e.g., those made with the user interface of FIG. 5, are received by the computer system 100 and stored in the member database 210. In Step 602, the computer system 100 queries a third party service 600 for latitude and longitude values corresponding to the location information associated with the new record and receives them from the third party service 600. The location parameters that are passed to the third party service 600 may be address, city, state, country, zip code, postal code, or any combination of the foregoing. The third party service 600 looks up the latitude and longitude values corresponding to the location parameters and returns them to the computer system 100. In an alternative embodiment, the latitude and longitude look up is not performed by the third party service 600, but by the computer system 100.

In Step 603, the latitude and longitude values are used to calculate corresponding LatQ and LongQ values using the following formula:

LatQ=Int((latitude+90)*k/r+1); and

LongQ=Int((longitude+180)*k* Cos (latitude)/r+1).

where k is a factor for converting a 1-degree arc measured with respect to earth's center into miles (k=2π*(earth's radius)/360°=69.0933 miles/degree); r is the length of the sides of the tiles and is 3.4 miles; and latitude and longitude values are expressed in degrees. Accuracy in the proximity searches can be improved by reducing r, but at the expense of computational speed. Computation speed of the proximity searches can be increased by increasing r, but at the expense of accuracy.

In Step 604, the (LatQ, LongQ) pair is stored in the member database 210 as part of the new record and is used as a pointer to identify the particular tile that covers the location associated with the new record. To optimize for database indexing, the (LatQ, LongQ) pair may be packed into a single integer value.

FIG. 7 illustrates a member database 210 containing location information. It shows the location information for records ME, A, B, C, and U, and the corresponding latitude and longitude values. Each record also has a pointer (x, y) that identifies the particular tile that covers the location associated with such record. Each of these pointers was derived in the manner illustrated in FIG. 6 when its corresponding record was entered into the database as a new record. For example, the record ME has a zip code 94087 which, according to a latitude and longitude look-up service, is located at 37.40 N latitude and 122.00 W longitude, and this location maps onto a tile that is located at point (x=2589, y=937).

FIG. 8 shows a sample input interface for specifying a search query that includes a proximity criterion. The input parameter "Your Location" defaults to the zip code of the person who is requesting this search, but it may be changed by the user if the user desires to perform the proximity search with respect to a different zip code. If the search query is being entered using a handheld electronic device that includes a GPS receiver and associated software that automatically determines the latitude and longitude values associated with the current location of the handheld electronic device, and the user desires to perform the proximity search based on the GPS-determined location, the user leaves the "Your Location" field blank, and the latitude and longitude values determined by the GPS receiver and associated software appears in the corresponding "Latitude" and "Longitude" fields and are passed as part of the search query. The location specified in the "Your Location" field or the GPS-determined location represents the reference location from which the proximity search will be carried out.

The input parameter "Proximity" defines the distance value that is used in carrying out the proximity search. A distance value of 25 miles, as illustrated in FIG. 8, means that the proximity search will be carried out for all records having associated locations that are within 25 miles of the reference location. Other input parameters may be specified in conducting a proximity search (e.g., keywords, gender preference, marital status, etc.), but for simplicity, are not illustrated here. Also, the invention is applicable to any type of proximity searches, and not limited to proximity searches for members within a social network.

Figure 9:
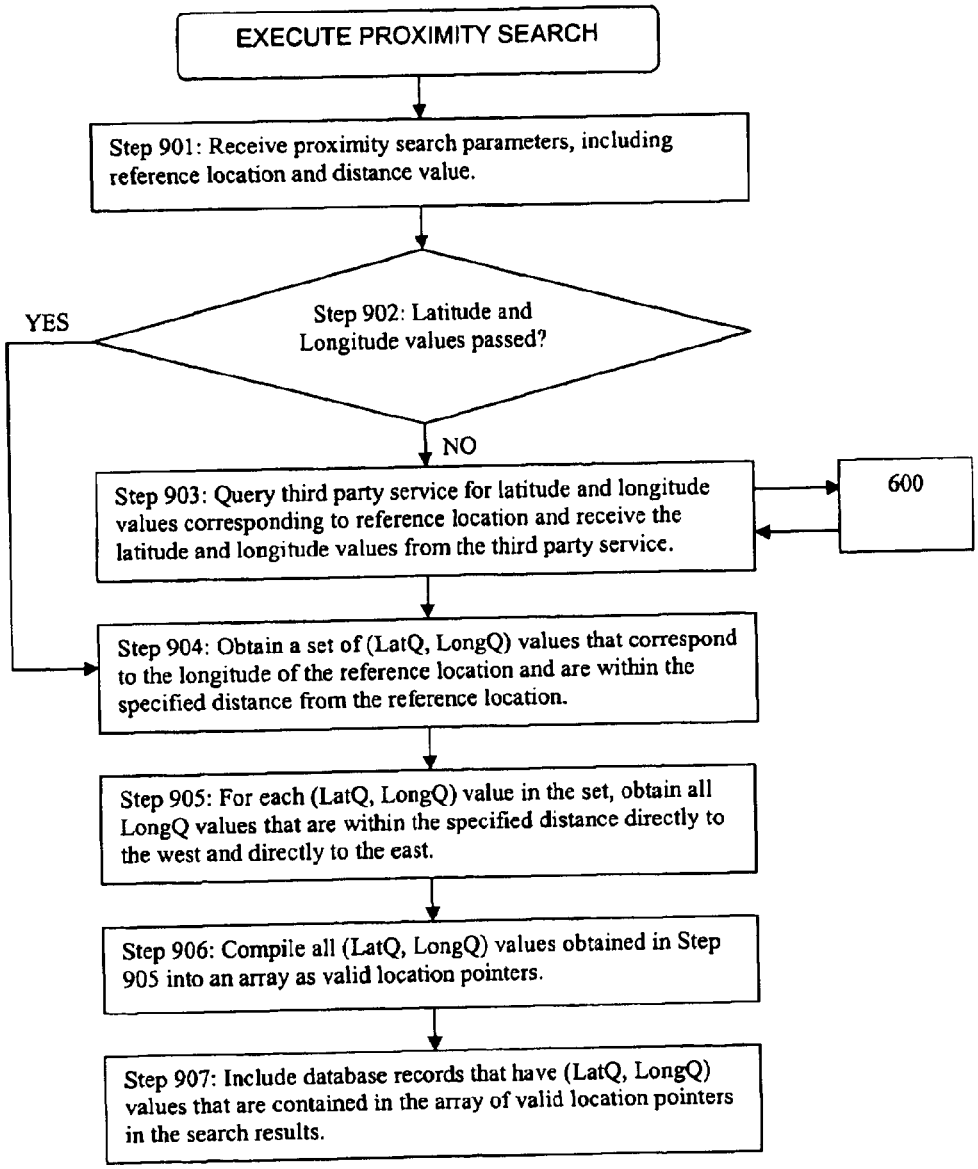
FIG. 9 is a flow diagram illustrating how search results that are responsive to the search query of FIG. 8 are obtained.

FIG. 9 is a flow diagram illustrating how search results that are responsive to the search query are obtained. In Step 901, the proximity search parameters, e.g., those made with the user interface of FIG. 8, are received by the computer system 100. In Step 902, a decision is made as to whether latitude and longitude values are passed as part of the search query. If not, the reference location information, e.g., zip code, is passed to the third party service 600, and the third party service 600 looks up the latitude and longitude values corresponding to the reference location information and returns them to the computer system 100 (Step 903). In an alternative embodiment, the latitude and longitude look up is not performed by the third party service 600, but by the computer system 100. Flow then proceeds to Step 904.

If the latitude and longitude values are passed as part of the search query, Step 903 is skipped and flow proceeds directly to Step 904. In Step 904, a set of (LatQ, LongQ) values that correspond to the longitude of the reference location and are within the specified distance from the reference location is obtained. In Step 905, for each (LatQ, LongQ) value in the set obtained in Step 904, all LongQ values that are within the specified distance directly to the west and directly to the east (i.e., to the west and to the east along the same latitude) are obtained. In Step 906, all (LatQ, LongQ) values obtained in Step 905 are compiled into an array as valid location pointers. In Step 907, if any records in the database have (LatQ, LongQ) values that are contained in the array of valid location pointers, these records are included in the search results.

The code that implements Steps 904-906 of FIG. 9 is reproduced below:

Range=Round((Distance−(r/2.0))/r); //r=3.4 miles, as specified before;

Distance represents the distance value that is specified in the search query;

---

Round represents an integer operation of rounding up

```
for (i = −Range; i <= Range; i++) {
    midBoxLat = latitude + i * r / k; // latitude is the latitude of
    the reference location; k is the factor for converting 1 degree of
```

-continued

```
    latitude into miles and equals 69.0933 miles/degree
    midBoxLatQ = Int((midBoxLat + 90)*k/r+1);
    midBoxLonQ = Int((longitude+180)*k*Cos(midBoxLat)/r+1); //
    longitude is the longitude of the reference location
    for (j = midBoxLonQ − Range; j <= midBoxLonQ +Range; j++) {
        list.add((midBoxLatQ | j);
    }
}
```

While particular embodiments according to the invention have been illustrated and described above, those skilled in the art understand that the invention can take a variety of forms and embodiments within the scope of the appended claims.

What is claimed is:

1. A method carried out by a computer system of identifying records based on proximity to a reference location in response to a search query, comprising the steps of:

*by one or more computing devices,* determining location data representative of the reference location; converting said location data into a reference location pointer that points to one of a plurality of predefined geographic regions, each of the predefined geographic regions having four sides of an equal surface distance and associated with a location pointer having a first index and a second index, the first index and the second index identifying a point on a coordinate system;

*by the one or more computing devices,* identifying a set of location pointers whose corresponding predefined geographic regions are within a certain distance from the predefined geographic region corresponding to the reference location pointer using an integer number, N, which is obtained by dividing the certain distance by the equal surface distance, wherein each of the location pointers in the set has a first index that differs from the first index of the reference location pointer by no more than N and a second index that differs from a third index by no more than N, wherein the third index is a function of the first index of the reference location pointer and represents the same longitudinal position as the reference location pointer; and

*by the one or more computing devices,* identifying records having location pointers that are in the set.

2. The method according to claim 1, wherein the search query specifies the certain distance.

3. The method according to claim 2, wherein the reference location is the location from which the search query is received.

4. The method according to claim 2, wherein the reference location is the location specified in a record corresponding to the user who submitted the search query.

5. The method according to claim 1, further comprising the step of maintaining a plurality of records in a database, each of the plurality of records including a location pointer to one of the plurality of predefined geographic regions.

6. The method according to claim 5, wherein the predefined geographic regions corresponding to the set of location pointers comprises a subset of the plurality of predefined geographic regions.

7. The method according to claim 1, wherein said location data comprises latitude and longitude values.

8. A record management system for performing searches based on proximity to a reference location, comprising:

a memory device containing a plurality of searchable records, each searchable record including a location pointer that corresponds to one of a plurality of predefined geographic regions, each of the predefined geographic regions having four sides of an equal surface distance and associated with a location pointer having a first index and a second index, the first index and the second index identifying a point on a coordinate system; and a processor programmed to: (i) receive a search query including the reference location and a distance value; (ii) generate a reference location pointer having a first index and a second index for the reference location; (iii) divide the distance value by the equal surface distance to obtain an integer number, N; (iv) identify a set of location pointers having a first index that differs from the first index of the reference location pointer by no more than N and a second index that differs from a third index by no more than N, wherein the third index is a function of the first index of the reference location pointer and represents the same longitudinal position as the reference location pointer; and (v) return records having location pointers in the identified set.

9. The system according to claim 8, wherein the processor is further programmed to: (i) receive an input of a searchable record including location information associated with the searchable record; (ii) convert the location information into a location pointer that corresponds to one of the plurality of predefined geographic regions; and (iii) store the location pointer.

10. The system according to claim 9, wherein the location information comprises a zip code.

11. The system according to claim 9, wherein the location information includes city and country.

*12. A method comprising:*

*by one or more computing devices, receiving a query from a first user of a social-networking system, the social-networking system comprising a graph that comprises a plurality of nodes and edges connecting the nodes, at least one node in the graph corresponding to the first user, the query comprising one or more location data corresponding to a location of the first user;*

*by the computing devices, identifying one or more second users of the social-networking system that are connected to the first user within the social-networking system, at least one node in the graph corresponding to each of the second users, at least one of the nodes corresponding to the first user and at least one of the nodes corresponding to a second user being connected to each other by one or more edges;*

*by the computing devices, determining a location of each of one or more of the second users;*

*by the computing devices, identifying one or more of the second users that are located within a threshold distance of the location of the first user, wherein identifying one or more of the second users that are located within a threshold distance of the location of the first users comprises:*

*by the computing devices, converting location information associated with each of at least one of the nodes corresponding to the second users to a location pointer that points to one of a plurality of predefined geographic regions, each of the plurality of predefined geographic regions having four sides of an equal surface distance and is associated with a location pointer having a first index and a second index, the first index and the second index identifying a point on a coordinate system;*

*by the computing devices, converting the one or more location data into a reference location pointer that points to one of the plurality of predefined geographic regions; and*

*by the computing devices, identifying a set of location pointers whose corresponding predefined geographic regions are within the distance from the predefined geographic region corresponding to the reference location pointer using an integer number, N, which is obtained by dividing the distance by the equal surface distance, wherein each location pointer from the set of location pointers has a first index that differs from the first index of the reference location pointer by no more than N and a second index that differs from a third index by no more than N, wherein the third index is a function of the first index of the reference location pointer and represents the same longitudinal position as the reference location pointer; and*

*by the computing devices, providing, as a response to the query, information associated with each of one or more of the second users that are located within the threshold distance of the location of the first user.*

*13. The method of claim 12, further comprising sending the response to the first user.*

*14. The method of claim 12, wherein the query comprises the threshold distance.*

*15. The method of claim 12, wherein:*

*the query comprises one or more keywords;*

*each of one or more nodes in the graph corresponding to each of one or more second users is associated with one or more keywords;*

*the method further comprises, by the computing devices, identifying among the second users that are located within the threshold distance of the location of the first user one or more second users that correspond to nodes associated with keywords matching the keywords of the query; and*

*information associated with a second user is provided as a response to the query only if the node corresponding to the second is associated with keywords matching the keywords in the query.*

*16. The method of claim 12, wherein:*

*the query comprises a gender;*

*each of one or more nodes in the graph corresponding to each of one or more second users indicates a gender of the second user;*

*the method further comprises, by the computing devices, identifying among the second users that are located within the threshold distance of the location of the first user one or more second users that match the gender in the query; and*

*information associated with a second user is provided as a response to the query only if the second user matches the gender in the query.*

*17. The method of claim 12, wherein:*

*the query comprises a marital status;*

*each of one or more nodes in the graph corresponding to each of one or more second users indicates a marital status of the second user;*

*the method further comprises, by the computing devices, identifying among the second users that are located within the threshold distance of the location of the first user one or more second users that match the marital status in the query; and*

*information associated with a second user is provided as a response to the query only if the second user matches the marital status in the query.*

*18. The method of claim 12 wherein identifying one or more of the second users that are located within a threshold distance of the location of the first users comprises:*

*mapping location information associated with each of at least one of the nodes corresponding to the second users to one of a plurality of geographic regions; and*

*mapping the location data to a first geographic region of the plurality of geographic regions.*

*19. A system comprising:*

*a memory comprising instructions executable by one or more processors; and*

*the processors coupled to the memory and operable to execute the instructions, the one or more processors being operable when executing the instructions to:*

*receive a query from a first user of a social-networking system, the social-networking system comprising a graph that comprises a plurality of nodes and edges connecting the nodes, at least one node in the graph corresponding to the first user, the query comprising one or more location data corresponding to a location of the first user;*

*identify one or more second users of the social-networking system that are connected to the first user within the social-networking system, at least one node in the graph corresponding to each of the second users, at least one of the nodes corresponding to the first user and at least one of the nodes corresponding to a second user being connected to each other by one or more edges;*

*determine a location of each of one or more of the second users;*

*identify one or more of the second users that are located within a threshold distance of the location of the first user, wherein to identify one or more of the second users that are located within a threshold distance of the location of the first users, the one or more processors are operable when executing the instructions to:*

*convert location information associated with each of at least one of the nodes corresponding to the second users to a location pointer that points to one of a plurality of predefined geographic regions, each of the plurality of predefined geographic regions having four sides of an equal surface distance and is associated with a location pointer having a first index and a second index, the first index and the second index identifying a point on a coordinate system;*

*convert the one or more location data into a reference location pointer that points to one of the plurality of predefined geographic regions; and*

*identify a set of location pointers whose corresponding predefined geographic regions are within the distance from the predefined geographic region corresponding to the reference location pointer using an integer number, N, which is obtained by dividing the distance by the equal surface distance, wherein each location pointer from the set of location pointers has a first index that differs from the first index of the reference location pointer by no more than N and a second index that differs from a third index by no more than N, wherein the third index is a function of the first index of the reference location pointer and represents the same longitudinal position as the reference location pointer; and*

*provide as a response to the query information associated with each of one or more of the second users that are located within the threshold distance of the location of the first user.*

*20. The system of claim 19, wherein the processors are further operable when executing the instructions to send the response to the first user.*

*21. The system of claim 19, wherein the query comprises the threshold distance.*

*22. The system of claim 19, wherein:*

*the query comprises one or more keywords;*

*each of one or more nodes in the graph corresponding to each of one or more second users is associated with one or more keywords;*

*the processors are further operable when executing the instructions to identify among the second users that are located within the threshold distance of the location of the first user one or more second users that correspond to nodes associated with keywords matching the keywords of the query; and*

*information associated with a second user is provided as a response to the query only if the node corresponding to the second is associated with keywords matching the keywords in the query.*

*23. The system of claim 19, wherein:*

*the query comprises a gender;*

*each of one or more nodes in the graph corresponding to each of one or more second users indicates a gender of the second user;*

*the processors are further operable when executing the instructions to identify among the second users that are located within the threshold distance of the location of the first user one or more second users that match the gender in the query; and*

*information associated with a second user is provided as a response to the query only if the second user matches the gender in the query.*

*24. The system of claim 19, wherein:*

*the query comprises a marital status;*

*each of one or more nodes in the graph corresponding to each of one or more second users indicates a marital status of the second user;*

*the processors are further operable when executing the instructions to identify among the second users that are located within the threshold distance of the location of the first user one or more second users that match the marital status in the query; and*

*information associated with a second user is provided as a response to the query only if the second user matches the marital status in the query.*

*25. The system of claim 19, wherein, to identify one or more of the second users that are located within a threshold distance of the location of the first users, the processors are operable when executing the instructions to:*

*map location information associated with each of at least one of the nodes corresponding to the second users to one of a plurality of geographic regions; and*

*map the location data to a first geographic region of the plurality of geographic regions.*

*26. One or more computer-readable non-transitory storage media embodying software operable when executed by one or more computer systems to:*

*receive a query from a first user of a social-networking system, the social-networking system comprising a graph that comprises a plurality of nodes and edges connecting the nodes, at least one node in the graph corresponding to the first user, the query comprising one or more location data corresponding to a location of the first user;*

*identify one or more second users of the social-networking system that are connected to the first user within the social-networking system, at least one node in the graph corresponding to each of the second users, at least one of the nodes corresponding to the first user and at least one of the nodes corresponding to a second user being connected to each other by one or more edges;*

*determine a location of each of one or more of the second users;*

*identify one or more of the second users that are located within a threshold distance of the location of the first user, wherein, to identify one or more of the second users that are located within a threshold distance of the location of the first users, the software is further operable when executed to:*

*convert location information associated with each of at least one of the nodes corresponding to the second users to a location pointer that points to one of a plurality of predefined geographic regions, each of the plurality of predefined geographic regions having four sides of an equal surface distance and is associated with a location pointer having a first index and a second index, the first index and the second index identifying a point on a coordinate system;*

*convert the one or more location data into a reference location pointer that points to one of the plurality of predefined geographic regions; and*

*identify a set of location pointers whose corresponding predefined geographic regions are within the distance from the predefined geographic region corresponding to the reference location pointer using an integer number, N, which is obtained by dividing the distance by the equal surface distance, wherein each location pointer from the set of location pointers has a first index that differs from the first index of the reference location pointer by no more than N and a second index that differs from a third index by no more than N, wherein the third index is a function of the first index of the reference location pointer and represents the same longitudinal position as the reference location pointer; and*

*provide as a response to the query information associated with each of one or more of the second users that are located within the threshold distance of the location of the first user.*

*27. The media of claim 26, wherein the software is further operable when executed to send the response to the first user.*

*28. The media of claim 26, wherein the query comprises the threshold distance.*

*29. The media of claim 26, wherein:*

*each of one or more nodes in the graph corresponding to each of one or more second users is associated with one or more keywords;*

*the software is further operable when executed to identify among the second users that are located within the threshold distance of the location of the first user one or more second users that correspond to nodes associated with keywords matching the keywords of the query; and*

*information associated with a second user is provided as a response to the query only if the node corresponding to the second is associated with keywords matching the keywords in the query.*

*30. The media of claim 26, wherein:*

*the query comprises a gender;*

*each of one or more nodes in the graph corresponding to each of one or more second users indicates a gender of the second user;*

*the software is further operable when executed to identify among the second users that are located within the*

*threshold distance of the location of the first user one or more second users that match the gender in the query; and*

*information associated with a second user is provided as a response to the query only if the second user matches the gender in the query.*

*31. The media of claim 26, wherein:*

*the query comprises a marital status;*

*each of one or more nodes in the graph corresponding to each of one or more second users indicates a marital status of the second user;*

*the software is further operable when executed to identify among the second users that are located within the threshold distance of the location of the first user one or more second users that match the marital status in the query; and*

*information associated with a second user is provided as a response to the query only if the second user matches the marital status in the query.*

*32. The media of claim 26, wherein, to identify one or more of the second users that are located within a threshold distance of the location of the first users, the software is further operable when executed to:*

*map location information associated with each of at least one of the nodes corresponding to the second users to one of a plurality of geographic regions; and*

*map the location data to a first geographic region of the plurality of geographic regions.*

* * * * *